(12) United States Patent
Kondo

(10) Patent No.: US 6,208,474 B1
(45) Date of Patent: Mar. 27, 2001

(54) ORIGINAL READING LENS AND ORIGINAL READING APPARATUS USING THE SAME

(75) Inventor: Kazuyuki Kondo, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/375,999

(22) Filed: Aug. 19, 1999

(30) Foreign Application Priority Data

Aug. 21, 1998 (JP) .................................................. 10-251996

(51) Int. Cl.⁷ ........................................................ G02B 9/36
(52) U.S. Cl. ........................... 359/775; 359/772; 359/771
(58) Field of Search .................................. 359/775, 772, 359/768, 765, 779, 771, 763

(56) References Cited

U.S. PATENT DOCUMENTS

| 3,733,115 | * | 5/1973 | Cox | 350/214 |
| 5,179,465 | | 1/1993 | Kondo | 359/218 |
| 5,731,915 | * | 3/1998 | Noda | 359/776 |

* cited by examiner

*Primary Examiner*—Georgia Epps
*Assistant Examiner*—Tim Thompson
(74) *Attorney, Agent, or Firm*—Fitzpatrick, Cella, Harper & Scinto

(57) ABSTRACT

An original reading lens for imaging the image information on the surface of an original on the surface of a sensor, includes an original reading lens having, in succession from the original side, a meniscus-shaped positive first lens having its convex surface facing the original side, a meniscus-shaped negative second lens having its convex surface facing the original side, a stop, a meniscus-shaped negative third lens having its convex surface facing the sensor side, and a meniscus-shaped positive fourth lens having its convex surface facing the sensor side, and the surface of a diffracting optical element disposed near the stop.

5 Claims, 12 Drawing Sheets

ORIGINAL READING LENS AND ORIGINAL READING APPARATUS USING THE SAME

BACKGROUND OF THE INVENTION

1. Field of the Invention

This invention relates to an original reading lens and an original reading apparatus using the same, and is particularly suitable for an apparatus for imaging the image information on the surface of an original such as a document, literature, a drawing sheet or film on a reduced scale on the surface of a sensor such as a line sensor and reading it, for example, an image scanner, a film scanner, a digital copying apparatus or the like.

2. Related Background Art

There have heretofore been proposed various original reading apparatuses designed to image the image information on the surface of an original, such as a document or literature, on a reduced scale on the surface of a sensor by an original reading lens, and read the image information from a signal from the sensor as electronic information.

As the original reading lens at this time, a lens system is desired in which the number of constituent lenses is small and the entire lens system is compact and moreover, relatively high optical performance is easily obtained. As an original reading lens satisfying such a desire, there is, for example, a symmetrical type lens system in which a plurality of lenses are disposed substantially symmetrically about a stop. As such symmetrical type lens system, there is, for example, a Tessar type lens of a three-unit, four-lens construction or a Gauss type lens of a four-unit, six-lens construction.

Generally the symmetrical type lens system has the feature that particularly images of high resolving power and high quality can be obtained easily.

When the image information on the surface of an original is to be imaged on a reduced scale on the surface of a sensor by an original reading lens and the image information is to be read as electronic information by a signal from the sensor, it becomes important to image the entire surface of the original on the surface of the sensor with high resolving power.

As an original reading lens, for example, a Tessar type, original reading lens of a three-unit, four-lens construction relatively sufficiently well corrects various aberrations, such as spherical aberration, curvature of the image field, and distortion. In this lens, however, astigmatism at a medium angle of view and coma off the axis have had the tendency to be great and remain. Therefore, the Tessar-type original reading lens is used in an image reading apparatus having low resolution and a narrow angle of view.

Also, this Tessar-type original reading lens is corrected to a certain level with respect to chromatic aberration, particularly on-axis chromatic aberration, but could not always be said to be sufficiently satisfactory as a lens system for a color image reading apparatus.

Particularly, of the on-axis chromatic aberration, the short wavelength side of the visible wavelength region becomes over-corrected and the long wavelength side becomes under-corrected, and in the wide range of the visible wavelength region, it has been difficult to correct well and it had remaining chromatic aberration (secondary spectrum). Therefore, when such an original reading lens is used in a color image reading apparatus, such as an image scanner, there has been the problem that the focus positions in various colors, such as R(red), G(green) and B(blue) somewhat differ from one another and the deterioration of the quality of read image occurs.

On the other hand, as the original reading lens, the Gauss type original reading lens of four-unit, six-lens construction sufficiently corrects various aberrations, such as spherical aberration, coma and curvature of image field. Therefore, it is used in an original reading apparatus having relatively high resolution and a wide angle of view.

However, with respect to chromatic aberration, the Gauss type original reading lens, like the Tessar-type original reading lens, has remaining chromatic aberration (secondary spectrum). Therefore, it has suffered from the problem that the focus positions in the color lights R, G and B differ from one another and the deterioration of the read image occurs.

To correct this remaining chromatic aberration relative to a wavelength of a wide band, it is necessary to use glass having an abnormal partial dispersing property, but there has been the problem that the glass of this kind is generally expensive and difficult to work.

SUMMARY OF THE INVENTION

The present invention has as its object the provision of an original reading lens in which a plurality of lenses are appropriately disposed substantially symmetrically about a stop and the surface of a diffracting optical element is utilized to thereby correct particularly chromatic aberration of various aberrations well over a wide band and in spite of a small number of constituent lenses, so that the image information of the entire surface of an original can be imaged on a reduced scale on the surface of a sensor with high resolving power and which can highly accurately read the image information as electronic information, and an original reading apparatus using the same.

The original reading lens of the present invention is an original reading lens for imaging the image information on the surface of an original on the surface of a sensor, characterized by, in succession from the original side, a meniscus-shaped positive first lens having its convex surface facing the original side, a meniscus-shaped negative second lens having its convex surface facing the original side, a stop, a meniscus-shaped negative third lens having its convex surface facing the sensor side, a meniscus-shaped positive fourth lens having its convex surface facing the sensor side, and a diffracting optical element surface disposed near the stop.

The original reading apparatus of the present invention is characterized by imaging the image information of the surface of an original on the surface of a sensor by the use of the original reading lens, and reading the image information.

DESCRIPTION OF THE PREFERRED EMBODIMENTS

Figure 1:
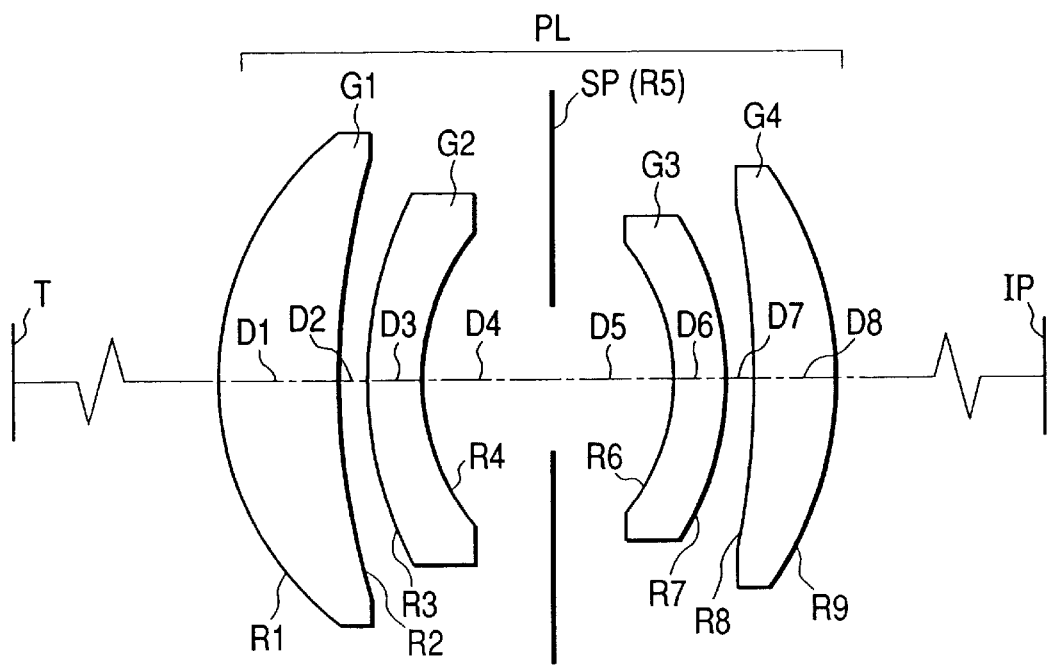
FIG. 1 is a cross-sectional view of the lens of Numerical Value Embodiment 1 of the present invention.
Figure 2:
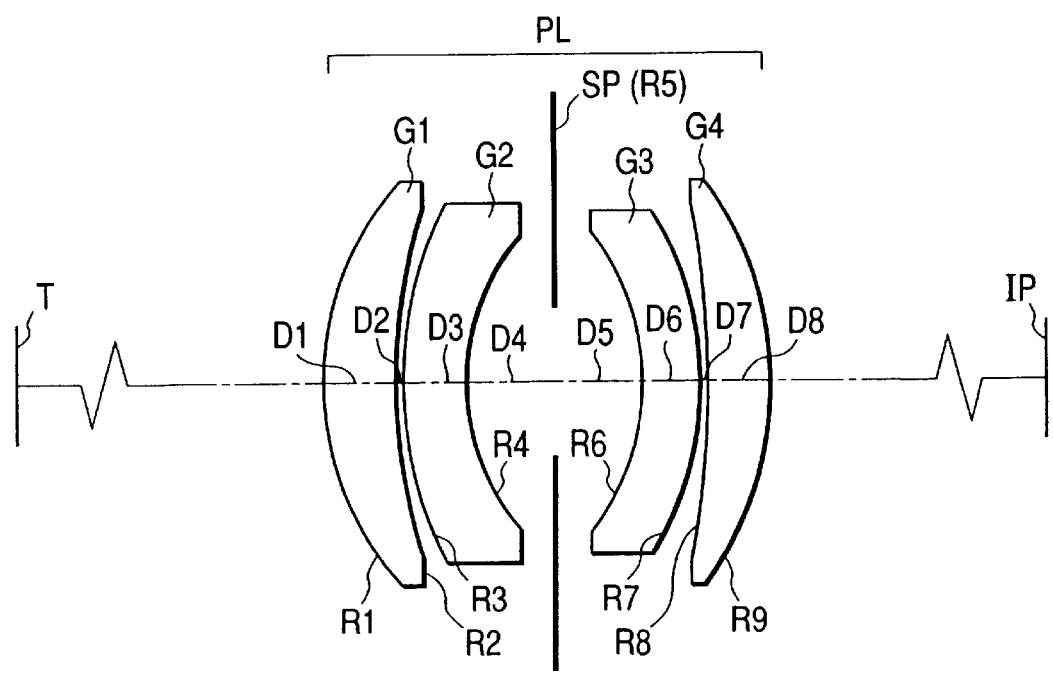
FIG. 2 is a cross-sectional view of the lens of Numerical Value Embodiment 2 of the present invention.
Figure 3:
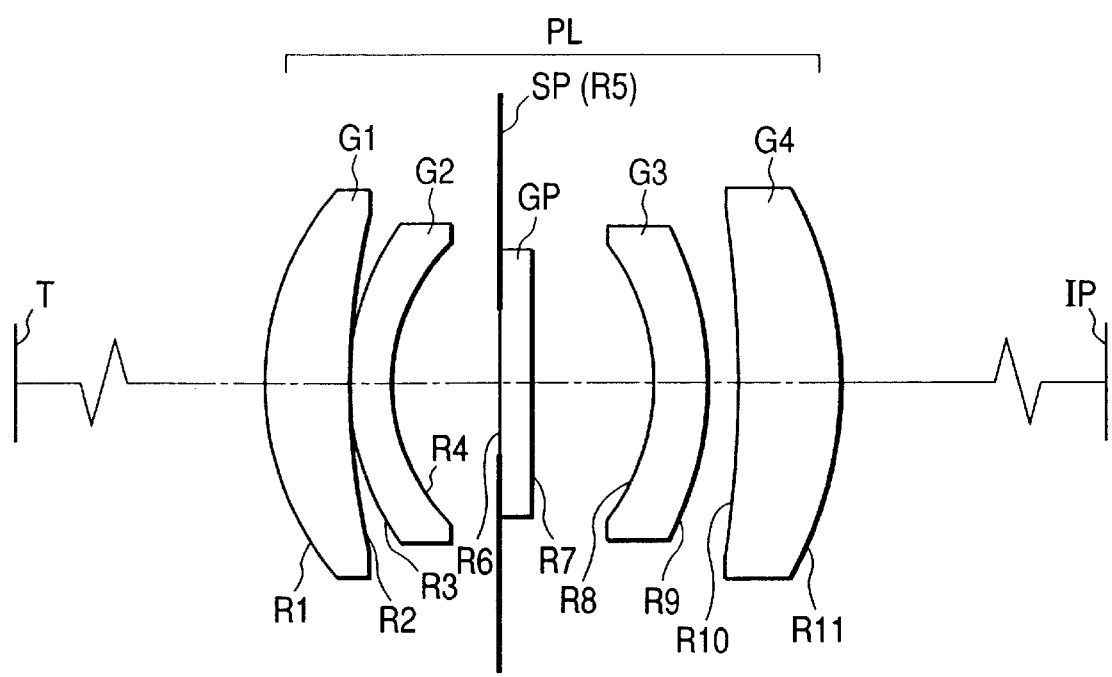
FIG. 3 is a cross-sectional view of the lens of Numerical Value Embodiment 3 of the present invention.
Figure 4:
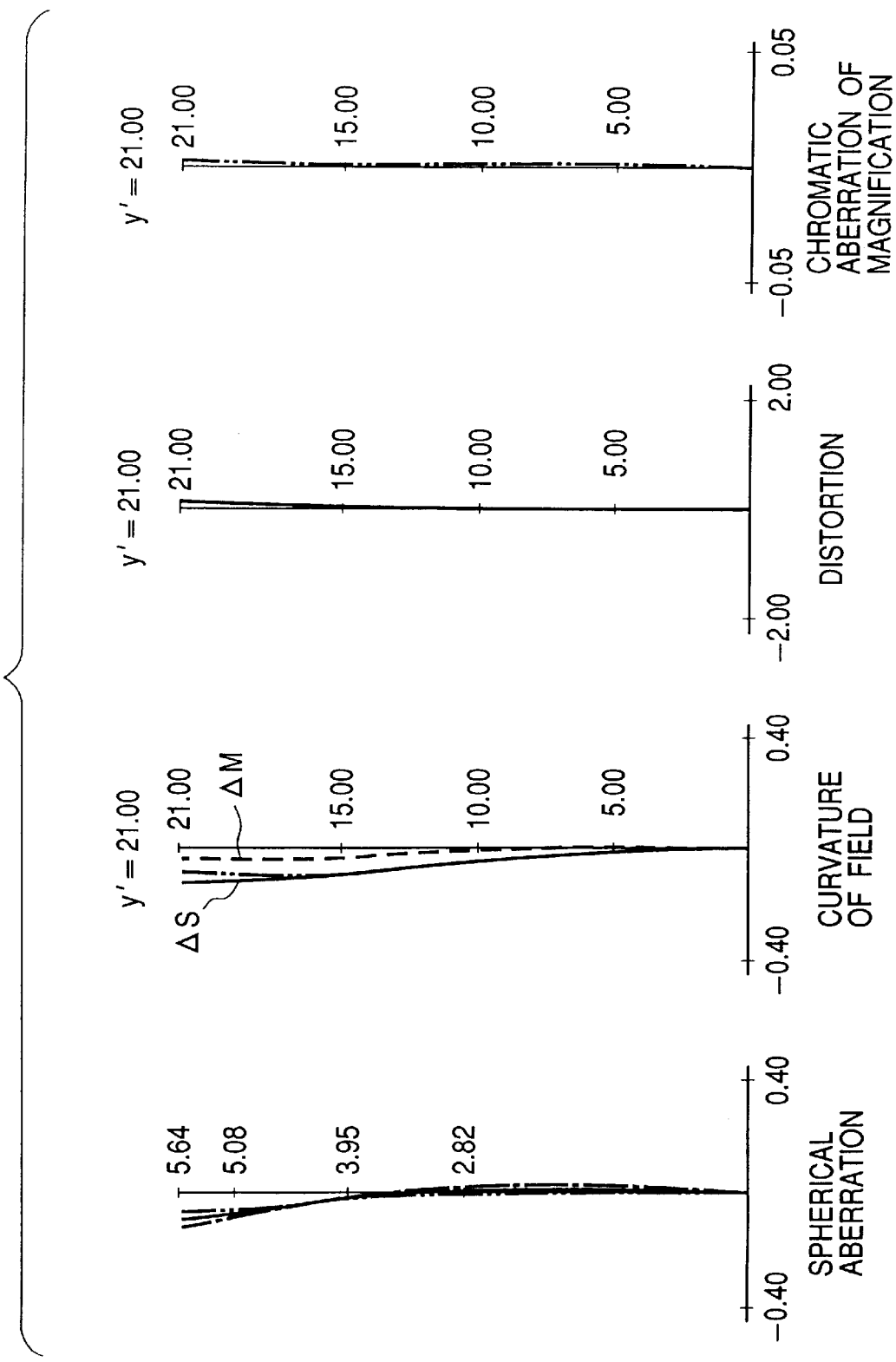
FIG. 4 shows the aberrations of Numerical Value Embodiment 1 of the present invention.
Figure 5:
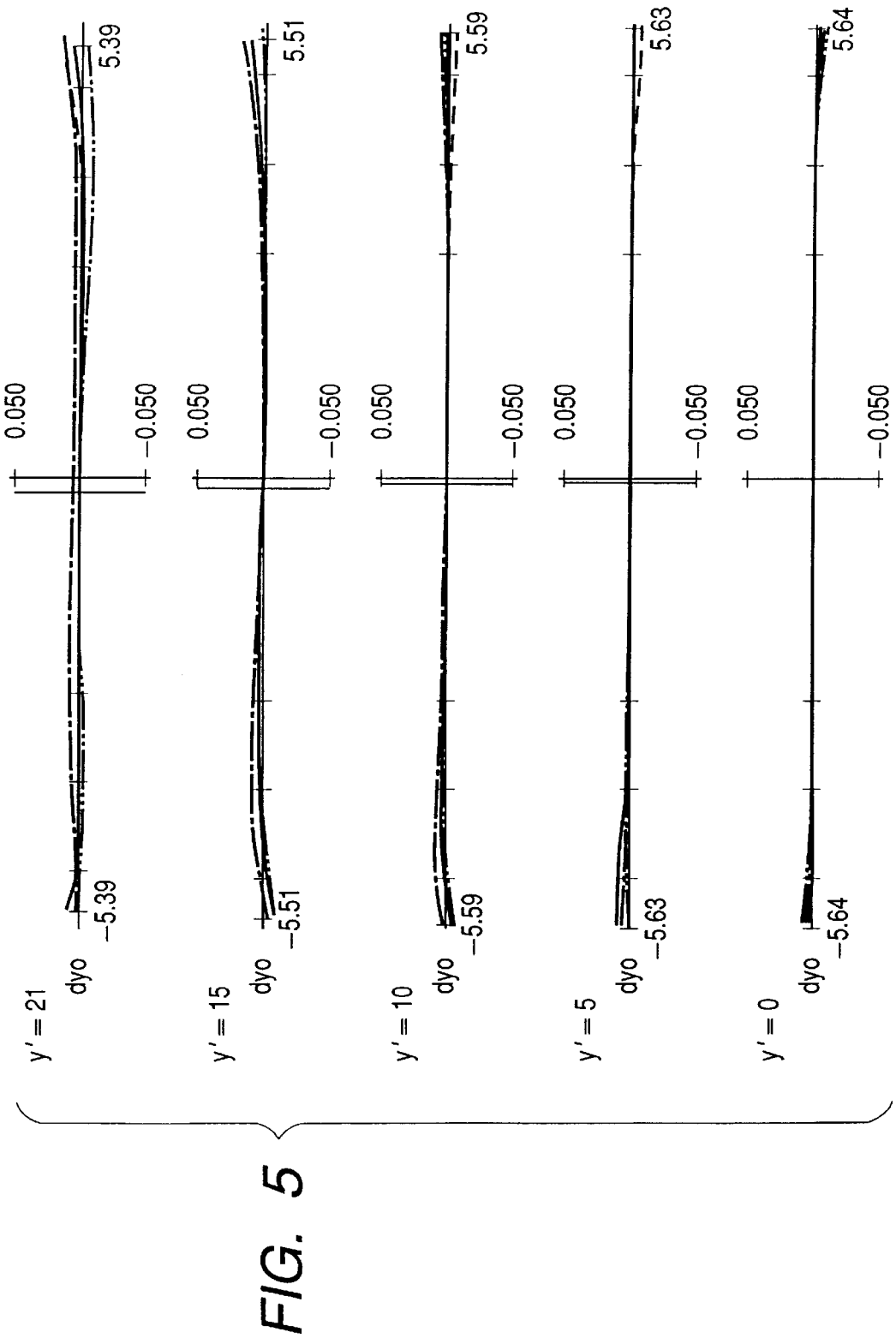
FIG. 5 shows the aberrations of Numerical Value Embodiment 1 of the present invention.
Figure 6:
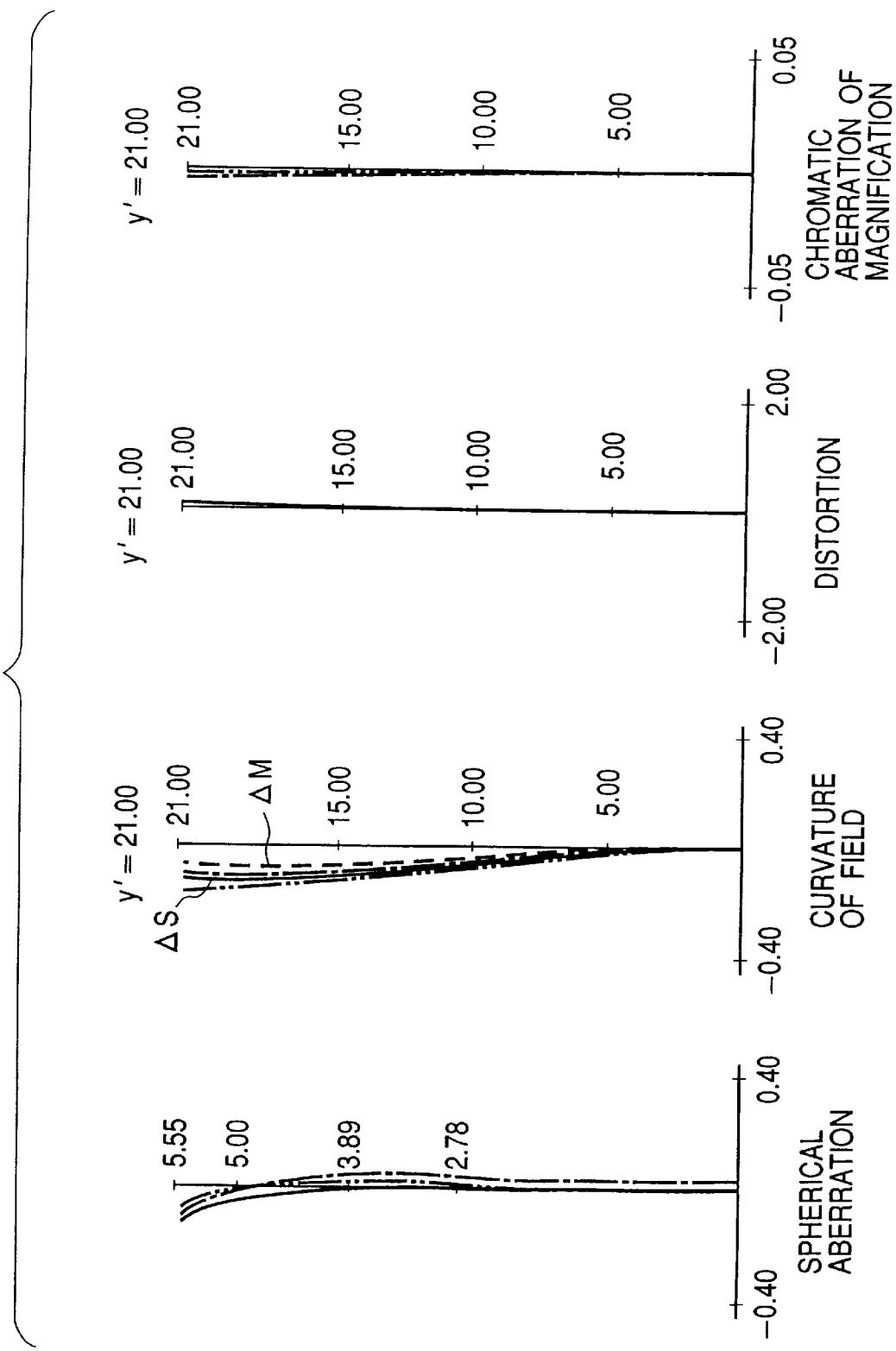
FIG. 6 shows the aberrations of Numerical Value Embodiment 2 of the present invention.
Figure 7:
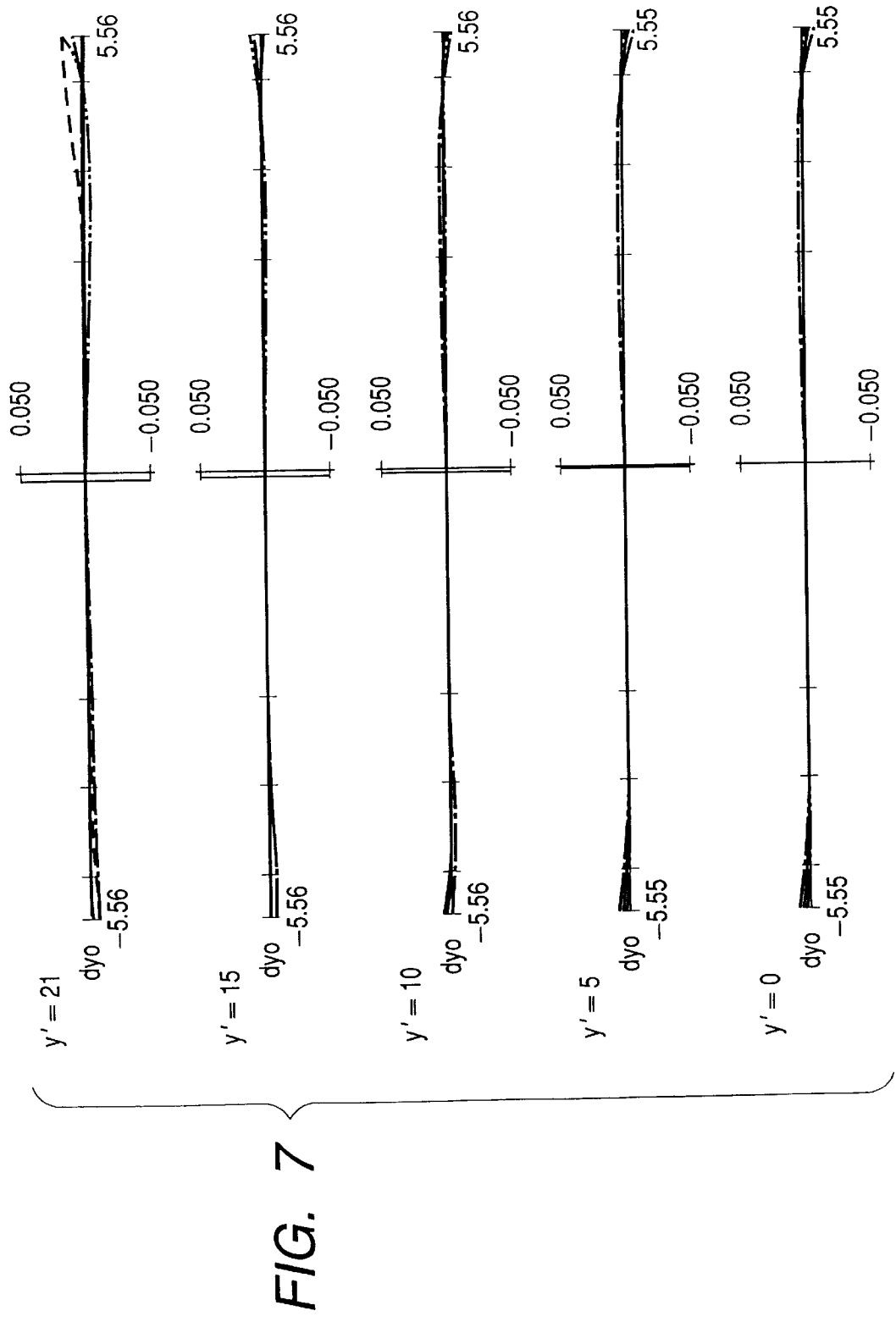
FIG. 7 shows the aberrations of Numerical Value Embodiment 2 of the present invention.
Figure 8:
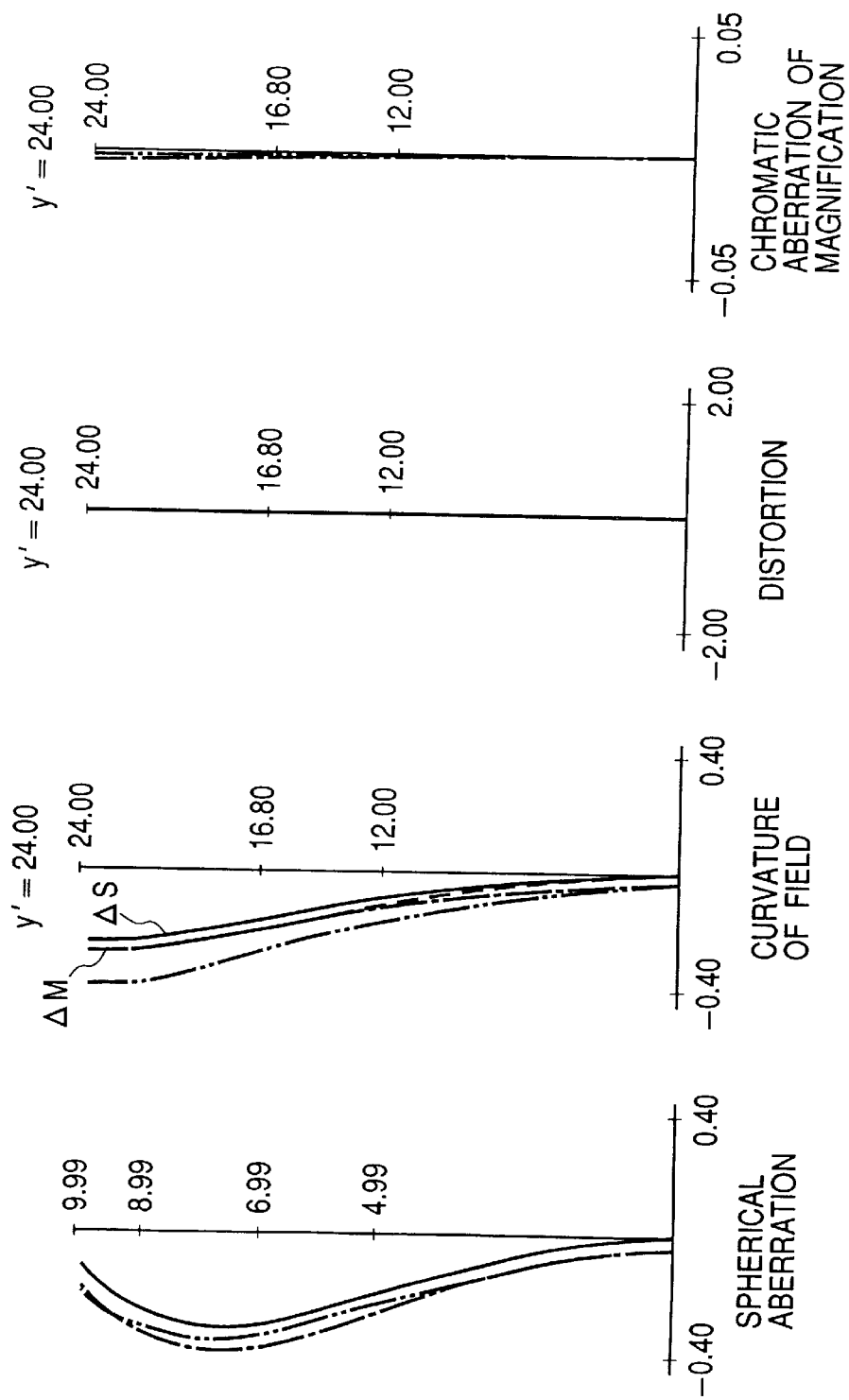
FIG. 8 shows the aberrations of Numerical Value Embodiment 3 of the present invention.
Figure 9:
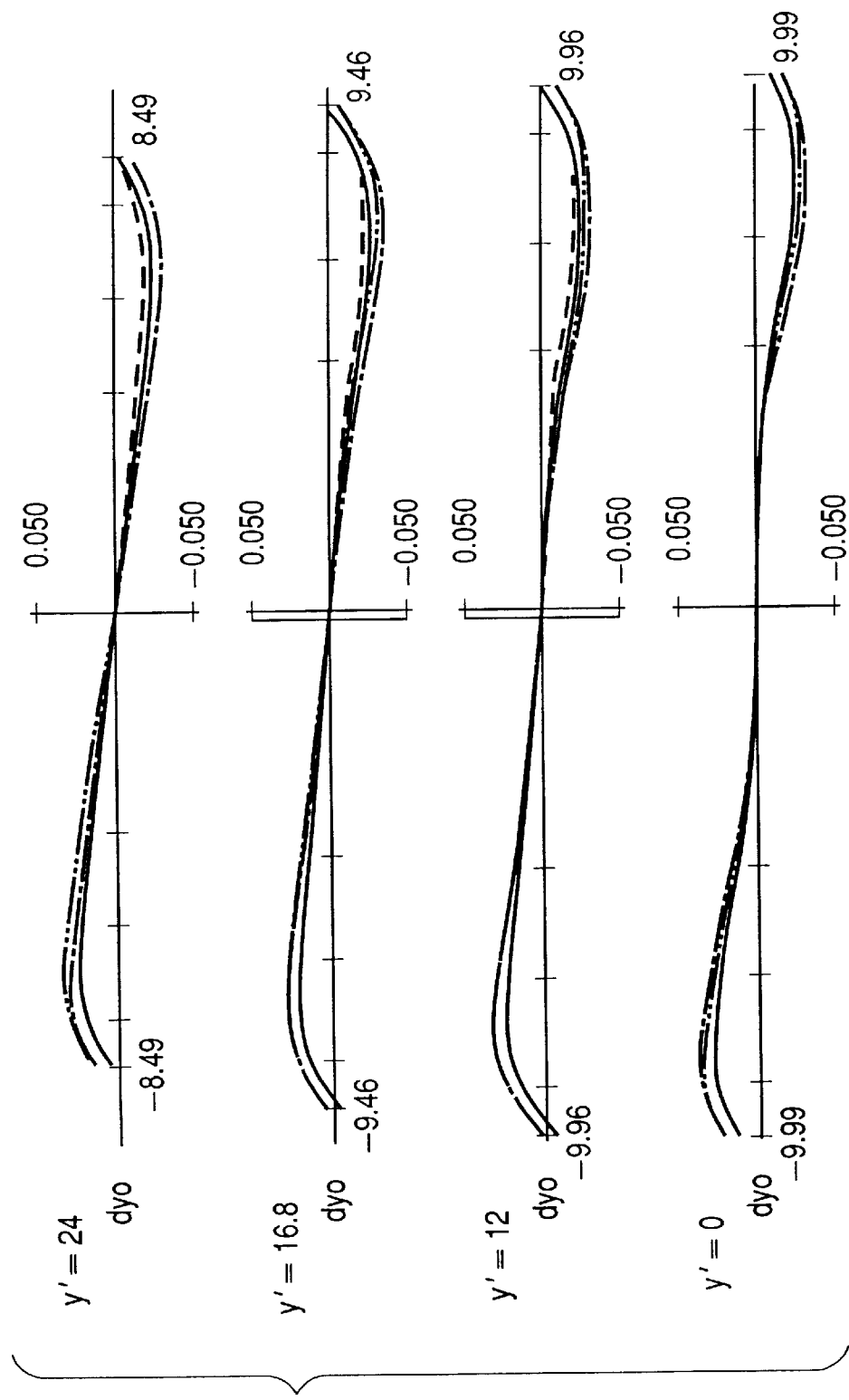
FIG. 9 shows the aberrations of Numerical Value Embodiment 3 of the present invention.

FIGS. 1 to 3 are cross-sectional views of the lenses of Numerical Value Embodiments 1 to 3, respectively, of the original reading lens of the present invention, which will be described later, and show the original reading lens as it is applied to an original reading apparatus. FIGS. 4 and 5 show the aberrations when the imaging magnification β of Numerical Value Embodiment 1 of the present invention is β=−0.19, FIGS. 6 and 7 show the aberrations when the imaging magnification β of Numerical Value Embodiment 2 of the present invention is β=−0.19, and FIGS. 8 and 9 show the aberrations when the imaging magnification β of Numerical Value Embodiment of the present invention is β=−0.19.

In FIGS. 1 to 3, PL designates an original reading lens. T denotes the surface of an original, and image information is formed on that surface. IP designates a sensor such as a line sensor or a CCD. Gi denotes the ith lens constituting the original reading lens PL, and SP designates a stop.

GP denotes a plane parallel plate provided near the stop SP. In the ith lens Gi constituting the original reading lens PL, G1 denotes a meniscus-shaped positive first lens having its convex surface facing the original side, G2 designates a meniscus-shaped negative second lens having its convex surface facing the original side, G3 denotes a meniscus-shaped negative third lens having its convex surface facing the sensor side, and G4 designates a meniscus-shaped positive fourth lens having its convex surface facing the sensor side.

In Numerical Value Embodiments 1 and 2 of FIGS. 1 and 2, the surface of a diffracting optical element is provided on at least one lens surface of the second lens G2 or the third lens G3, which is adjacent to the stop SP. Also, in Numerical Value Embodiment 3 of FIG. 3, the surface of a diffracting optical element is provided on at least one surface of the plane parallel plate GP. The phase of the surface of the diffracting optical element is appropriately set, whereby in spite of a simple four-unit, four-lens construction, on-axis chromatic aberration is well corrected over a wavelength range of a wide band.

Specifically, in Numerical Value Embodiment 1 of FIG. 1, the surface of the diffracting optical element is provided on the lens surface R4 of the second lens G2, which is adjacent to the stop SP, and in Numerical Value Embodiment 2 of FIG. 2, the surface of the diffracting optical element is provided on the surface R6 of the third lens G3, which is adjacent to the stop SP, and in Numerical Value Embodiment 3 of FIG. 3, the surface of the diffracting optical element is provided on the surface R6 of the plane parallel plate GP, which is adjacent to the stop SP.

In the present embodiment, the correction of on-axis chromatic aberration is effected by the utilization of the optical characteristic that the optical action of the surface of the diffracting optical element is negative conversely to the sign of the Abbe number of an ordinary optical material. That is, utilization is made of the optical characteristic that the way in which chromatic aberration appears for a ray of a reference wavelength becomes converse to that of a refraction type lens.

The surface of the diffracting optical element is provided near the stop, whereby by the utilization of the fact that the passage position of an off-axis light beam from the optical axis is low, the adverse effect onto off-axis aberration is minimized to thereby efficiently correct on-axis chromatic aberration. Also, by appropriately combining the refracting action of a refraction type lens and the diffracting action of the surface of the diffracting optical element together, off-axis chromatic aberration is well corrected with the other aberrations.

In the embodiments of FIGS. 1 to 3, the surface of the diffracting optical element is not limited to one, but a plurality of surfaces may be provided, and according to this, the refractive power of each surface of the diffracting optical element can be made small and the manufacture becomes easy, and the on-axis chromatic aberration can be corrected better over a wavelength range of a wide band.

In the present invention, when the refractive power of the surface of the diffracting optical element is defined as $\phi^d$ and the focal length of the entire system is defined as f, $$0.02 < f \times \phi_d < 0.06 \quad (1)$$

is satisfied.

Conditional expression (1) is for appropriately setting the refractive power $\phi_d$ of the surface of the diffracting optical element, and correcting chromatic aberration well while reducing the influence of the other diffracted lights than 1st-order diffracted light used as an imaging action.

If the refractive power $\phi_d$ of the surface of the diffracting optical element becomes too great beyond the upper limit value of conditional expression (1), on-axis chromatic aberration will become over-corrected and the influence upon off-axis aberration will increase the grating pitch difference between the central portion, and the peripheral portion of the surface of the diffracting optical element will increase and manufacture will become difficult, and this is not good.

On the other hand, if the refractive power $\phi_d$ of the surface of the diffracting optical element becomes too small beyond the lower limit value of conditional expression (1), on-axis chromatic aberration will become under-corrected and the influence of the other diffracted lights than the 1st-order diffracted light will increase and flare, and this is not good.

The original reading lens of the present invention is comprised of a lens system comprising two lenses disposed substantially symmetrically on the opposite sides of the stop SP.

Thereby the various aberrations, particularly coma, astigmatism, distortion, etc. occurring in the front lens unit (the first lens and the second lens) provided more adjacent to the original side than the stop SP are well-balancedly corrected by the rear lens unit (the third lens and the fourth lens).

Also, spherical aberration is corrected well with the lens surface in which the passage positions of an on-axis light beam and an off-axis marginal light beam are separate from the optical axis, e.g. the lens surface (R3) of the second lens, which is adjacent to the original, as an aspherical surface.

The diffracting optical element in the present embodiment is binarily manufactured by the lithographic technique, which is a manufacturing technique for a holographic optical element (HOE). The diffracting optical element may also be manufactured by binary optics. In this case, in order to further increase the diffraction efficiency, it may be made into a saw-like shape called quinoform. It may also be manufactured by molding by a mold manufactured by one of these methods.

When the reference wavelength (e-line) is defined as $\lambda$ and the distance from the optical axis is defined as h and the phase coefficient is defined as $C_{2i}$ (i=1, 2, ...) and the phase is defined as $\phi(h)$, the shape of the diffracting optical element in the present embodiment is represented by the following expression:

$$\phi(h)=2\pi/\lambda(C_2 \cdot h^2 + C_4 \cdot h^4 + \ldots C_{(2i)} \cdot h^{2i})$$

Figure 10:
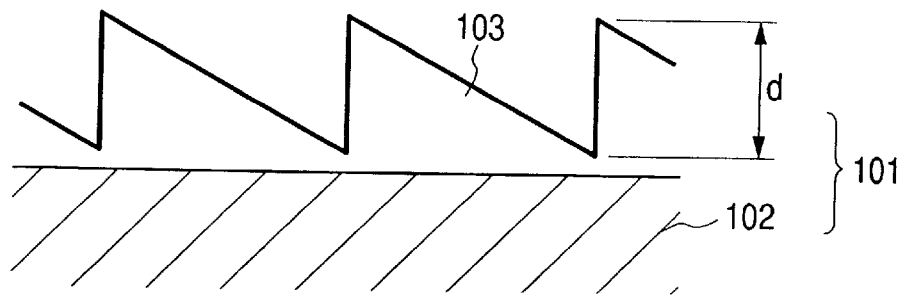
FIG. 10 is an illustration of a diffracting optical element according to the present invention.
Figure 13:
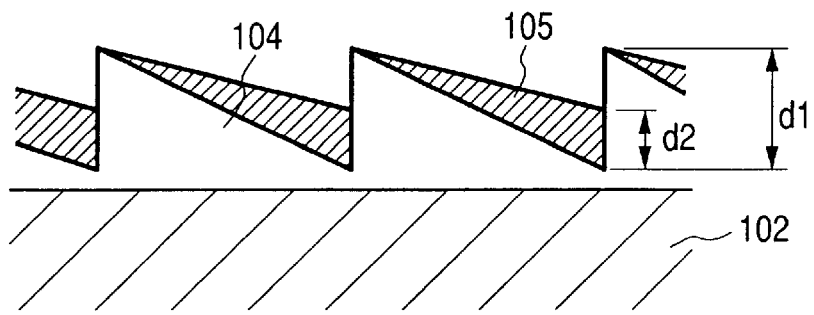
FIG. 13 is an illustration of a diffracting optical element according to the present invention.

As the construction of the diffracting optical element used in the present embodiment, the one-layer construction of a one-layer quinoform shape as shown in FIG. 10, or the two-layer construction as shown in FIG. 13, wherein two layers of different (or equal) grating thicknesses are laminated, is applicable.

Figure 11:
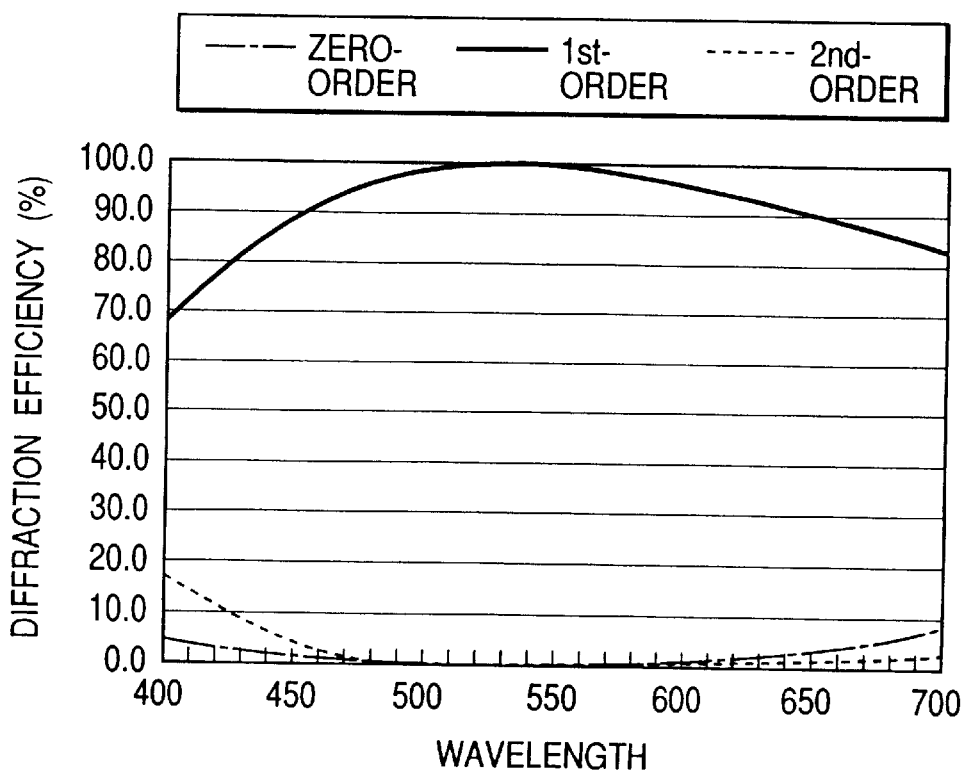
FIG. 11 is an illustration of the wavelength dependence characteristic of the diffracting optical element according to the present invention.

FIG. 11 shows the wavelength dependence characteristic of the diffraction efficiency of the 1st-order diffracted light of the diffracting optical element 101 shown in FIG. 10. The construction of the actual diffracting optical element 101 is such that ultraviolet-setting resin is applied to the surface of a base material 102 and a layer 103 of such a grating thickness d that the diffraction efficiency of 1st-order diffracted light is 100% for a wavelength 530 nm is formed on the resin portion.

As is apparent from FIG. 11, the diffraction efficiency of the design order number is reduced away from the optimized wavelength 530 nm, and on the other hand, the diffraction efficiency of O-order diffracted light and 2nd-order diffracted light which are the order number in the vicinity of the design order number increases. The increase in the diffracted lights of the other order numbers than the design order number causes flare, and this leads to a reduction in the resolution of the optical system.

Figure 12:
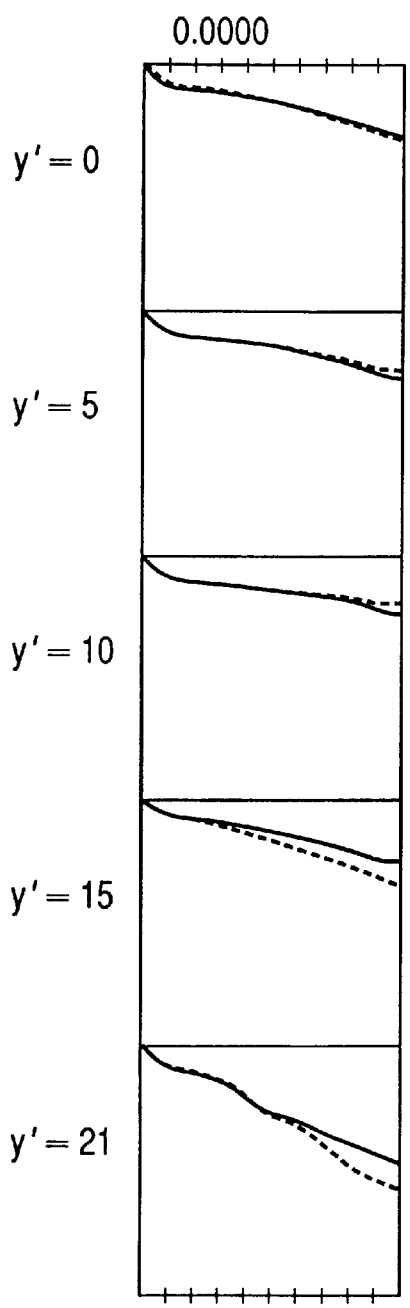
FIG. 12 shows the MTF characteristic when use is made of the diffracting optical element according to the present invention.

FIG. 12 shows the MTF characteristic for a spatial frequency when the grating shape of FIG. 10 is applied to Numerical Value Embodiment 1. In FIG. 12, y' indicates the image height. In FIG. 12, the MTF in the low frequency area is somewhat reduced.

Figure 14:
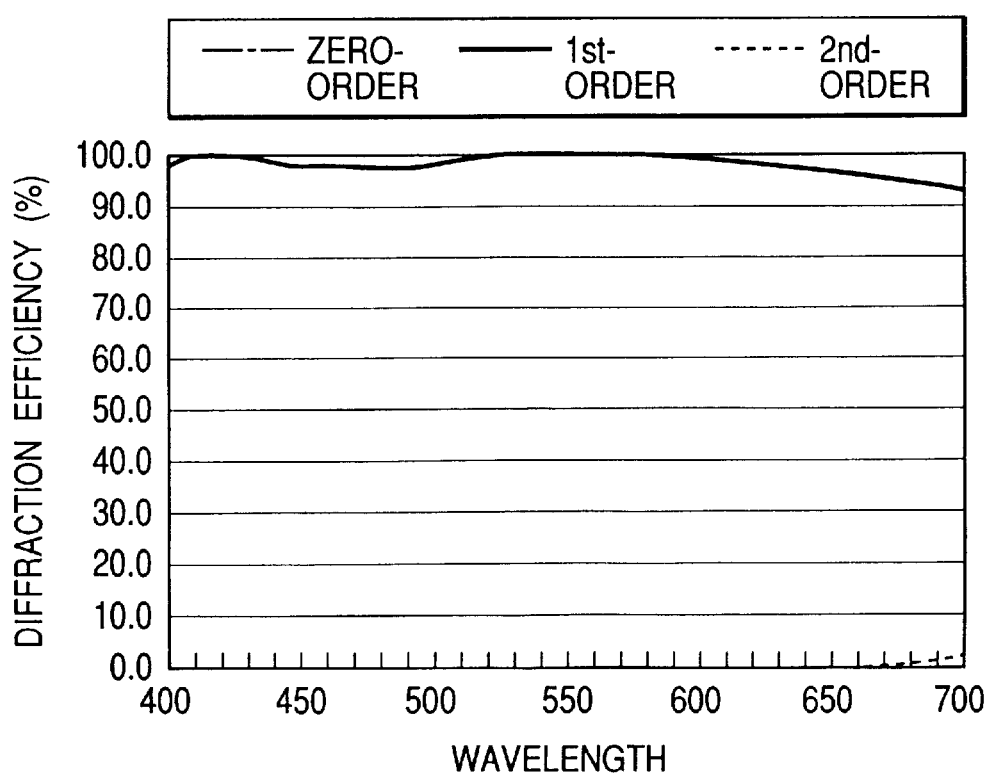
FIG. 14 is an illustration of the wavelength dependence characteristic of the diffracting optical element according to the present invention.

FIG. 14 shows the wavelength dependence characteristic of the diffraction efficiency of the 1st-order diffracted light of a diffracting optical element of a laminated type shown in FIG. 13 wherein two layers 104 and 105 are laminated.

In FIG. 13, a first layer 104 comprising ultraviolet-setting resin (nd=1.499, vd=54) is formed on a base material 102, and a second layer 105 comprising discrete ultraviolet-setting resin (nd=1.598, vd=28) is formed thereon. In the combination of these materials, the grating thickness d1 of the first layer 104 is d1=13.8 μm and the grating thickness d2 of the second layer 105 is 10.5 μm.

As can be seen from FIG. 14, by using a diffracting optical element of laminated structure, the diffraction efficiency of the design order number is as high as 95% or greater in the entire wavelength range used.

Figure 15:
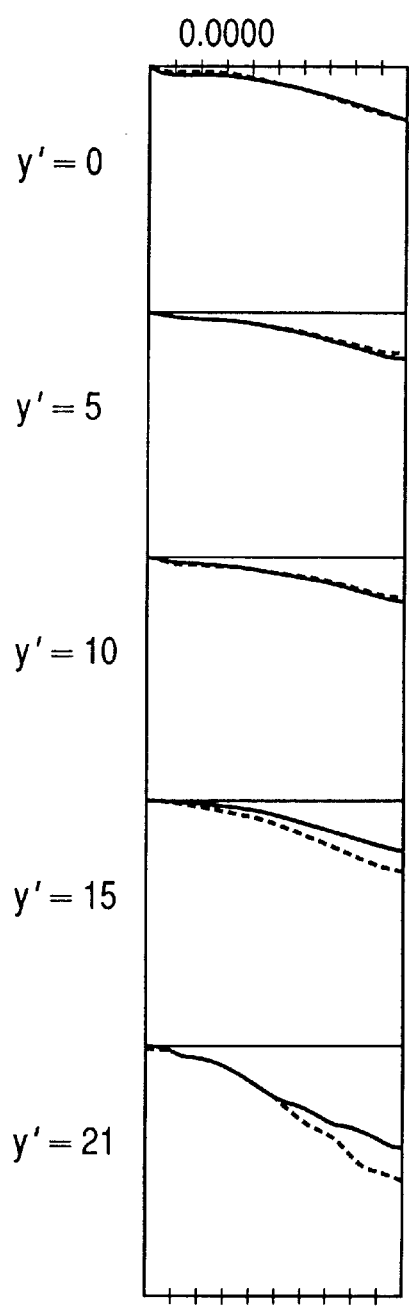
FIG. 15 shows the MTF characteristic when use is made of the diffracting optical element according to the present invention.

FIG. 15 shows the MTF characteristic for a spatial frequency when the grating shape of FIG. 13 is applied to Numerical Value Embodiment 1. If a diffracting optical element of laminated structure is used, the MTF of a low frequency is improved and a desired MTF characteristic is obtained. If as described above, the laminated structure is used as the diffracting optical element according to the present invention, the optical performance can be further improved.

Figure 16:
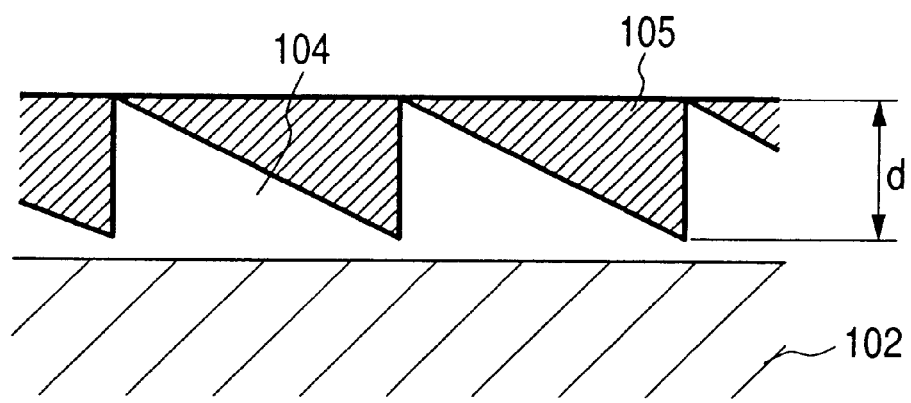
FIG. 16 is an illustration of a diffracting optical element according to the present invention.

As the aforedescribed diffracting optical element of laminated structure, the material thereof is not restricted to ultraviolet-setting resin, but other plastic materials or the like can also be used, and depending on the base material, the first layer 104 may be directly formed on the base material. Also, the grating thicknesses need not always differ from each other, but depending on the combination of materials, the grating thicknesses of the two layers 104 and 105 may be made equal to each other as shown in FIG. 16.

In this case, the grating shape is not formed on the surface of the diffracting optical element and therefore, the diffracting optical element is excellent in dustproof property and the assembling work thereof can be improved.

The numerical value embodiments of the present invention will be shown below. In the numerical value embodiments, γi represents the radius of curvature of the ith lens surface from the object side (the original side), di represents the thickness and air space of the ith lens from the object side, and ni and vi represent the refractive index and Abbe number, respectively, of the glass of the ith lens from the object side. β is the imaging magnification. Also, the relation between the aforementioned conditional expression and each numerical value embodiment is shown in Table 1 below.

When the X-axis is taken in the direction of the optical axis and the distance from the optical axis in a direction perpendicular to the optical axis is defined as H and the direction of travel of light is positive and the paraxial radius of curvature is defined as R and A, B, C, D, E and F are aspherical surface coefficients, the aspherical shape is represented by the following expression:

$$X = \frac{(1/R)H^2}{1+\sqrt{1-(H/R)^2}} + AH^2 + BH^4 + CH^6 + DH^8 + EH^{10}$$

[Numerical Value Embodiment 1]

| | | |
|---|---|---|
| f = 55.80 | $F_{NO}$ = 5.0 | β = −0.18898 |
| R1 = 15.524 | D1 = 5.53 | N1 = 1.69680  v1 = 55.5 |
| R2 = 39.141 | D2 = 1.30 | |
| R3 = 18.260 (aspherical surface) | D3 = 2.52 | N3 = 1.72250  v3 = 29.2 |
| R4 = 10.574 (DOE surface) | D4 = 6.20 | |
| R5 = 0 | D5 = 5.81 | |
| R6 = −9.725 | D6 = 2.60 | N6 = 1.71736  v6 = 29.5 |
| R7 = −13.856 | D7 = 1.32 | |
| R8 = −56.737 | D8 = 4.07 | N8 = 1.62041  v8 = 60.3 |
| R9 = −17.561 | | | surface R3 aspherical surface coefficient
A = 0
B = −1.11271 × 10$^{-5}$
C = −1.70066 × 10$^{-7}$
D = 1.82852 × 10$^{-9}$
E = −8.67839 × 10$^{-12}$ R4 phase coefficient
C2 = −3.24049 × 10$^{-4}$
C4 = 2.05537 × 10$^{-6}$
C6 = −4.26998 × 10$^{-7}$
C8 = 1.14978 × 10$^{-8}$
C10 = −9.93381 × 10$^{-11}$ -continued

[Numerical Value Embodiment 2]

| f = 54.90 | $F_{NO}$ = 5.0 | β = −0.18898 | |
|---|---|---|---|
| R1 = 14.206 (aspherical surface) | D1 = 3.42 | N1 = 1.69680 | v1 = 55.5 |
| R2 = 26.939 | D2 = 0.29 | | |
| R3 = 18.218 | D3 = 3.00 | N3 = 1.72250 | v3 = 29.2 |
| R4 = 11.796 (aspherical surface) | D4 = 4.09 | | |
| R5 = 0 | D5 = 4.42 | | |
| R6 = −10.223 (DOE surface) | D6 = 2.85 | N6 = 1.71736 | v6 = 29.5 |
| R7 = −15.425 | D7 = 0.30 | | |
| R8 = −48.098 | D8 = 3.18 | N8 = 1.62041 | v8 = 60.3 |
| R9 = −15.404 | | | |

| surface R1 aspherical surface coefficient | surface R4 aspherical surface coefficient | R6 phase coefficient |
|---|---|---|
| A = −1.28665 × 10$^{-3}$ | A = 1.60624 × 10$^{-3}$ | C2 = −2.26804 × 10$^{-4}$ |
| B = 1.26102 × 10$^{-5}$ | B = 7.10641 × 10$^{-5}$ | C4 = 1.20417 × 10$^{-6}$ |
| C = 9.83740 × 10$^{-8}$ | C = 9.99120 × 10$^{-7}$ | C6 = −3.02757 × 10$^{-8}$ |
| D = −2.43814 × 10$^{-10}$ | D = −4.40866 × 10$^{-9}$ | C8 = −3.06573 × 10$^{-9}$ |
| E = 8.78036 × 10$^{-12}$ | E = 2.94379 × 10$^{-10}$ | C10 = 5.06610 × 10$^{-12}$ |

[Numerical Value Embodiment 3]

| f = 77.16 | $F_{NO}$ = 4.0 | β = −0.15748 | |
|---|---|---|---|
| R1 = 20.397 | D1 = 5.22 | N1 = 1.69680 | v1 = 55.5 |
| R2 = 39.415 | D2 = 0.22 | | |
| R3 = 17.618 | D3 = 2.78 | N3 = 1.78472 | v3 = 25.7 |
| R4 = 13.038 | D4 = 7.23 | | |
| R5 = 0 | D5 = 0.09 | | |
| R6 = 0 (DOE surface) | D6 = 2.60 | N6 = 1.51633 | v6 = 64.2 |
| R7 = 0 | D7 = 7.54 | | |
| R8 = −14.749 | D8 = 3.80 | N8 = 1.72825 | v8 = 28.5 |
| R9 = −20.652 | D9 = 1.95 | | |
| R10 = −81.490 | D10 = 6.49 | N10 = 1.69680 | v10 = 55.5 |
| R11 = −30.432 | | | |

R6 phase coefficient
C2 = −3.32965 × 10$^{-4}$
C4 = −1.09619 × 10$^{-6}$
C6 = 0
C8 = 0
C10 = 0

| conditional expression | numerical value embodiment | | |
|---|---|---|---|
| | 1 | 2 | 3 |
| f×φ$_d$ | 0.036 | 0.025 | 0.051 |

According to the present invention, as described above, there can be achieved an original reading lens in which a plurality of lenses are appropriately disposed substantially symmetrically about a stop and the surface of a diffracting optical element is utilized to thereby well correct various aberrations, particularly chromatic aberration over a wide band, and which, in spite of a small number of constituent lenses, can image the image information of the entire surface of an original on a reduced scale on the surface of a sensor with high resolving power, and can highly accurately read the image information as electronic information, and an original reading apparatus using the same.

What is claimed is:

1. An original reading lens for imaging image information on the surface of an original on the surface of a sensor, comprising an original reading lens having, in succession from the original side, a meniscus-shaped positive first lens having its convex surface facing the original side, a meniscus-shaped negative second lens having its convex surface facing the original side, a stop, a meniscus-shaped negative third lens having its convex surface facing the sensor side, and a meniscus-shaped positive fourth lens having its convex surface facing the sensor side, and the surface of a diffracting optical element disposed near said stop.

2. An original reading lens according to claim 1, wherein the surface of said diffracting optical element is provided on at least one lens surface of said second lens or said third lens which is adjacent to said stop.

3. An original reading lens according to claim 1, wherein the surface of said diffracting optical element is provided on at least one surface of a plane parallel plate provided near said stop.

4. An original reading lens according to claim 1, wherein when the refractive power of the surface of said diffracting optical element is defined as φ$_d$ and the focal length of the entire system is defined as f, $$0.02 < f \times \phi_d < 0.06$$

is satisfied.

5. An original reading lens according to claim 1, which is used in an original reading apparatus for imaging the image information of the surface of an original on the surface of a sensor and reading said image information.

* * * * *